(12) United States Patent
Smith et al.

(10) Patent No.: US 11,669,886 B2
(45) Date of Patent: *Jun. 6, 2023

(54) SYSTEMS AND METHODS FOR DETERMINING AN ORDER COLLECTION START TIME

(71) Applicant: Walmart Apollo, LLC, Bentonville, CA (US)

(72) Inventors: Austin Lee Smith, San Jose, CA (US); Vidyanand Krishnan, Sunnyvale, CA (US); Michael Gilbert Ebener, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/149,973

(22) Filed: Jan. 15, 2021

(65) Prior Publication Data
US 2021/0133859 A1 May 6, 2021

Related U.S. Application Data

(63) Continuation of application No. 15/649,461, filed on Jul. 13, 2017, now Pat. No. 10,909,612.

(51) Int. Cl.
*G06Q 10/087* (2023.01)
*G06Q 10/08* (2023.01)
(Continued)

(52) U.S. Cl.
CPC . *G06Q 30/0635* (2013.01); *G06Q 10/063116* (2013.01); *G06Q 10/063118* (2013.01); *G06Q 10/08* (2013.01); *G06Q 10/087* (2013.01)

(58) Field of Classification Search
CPC ....... G06Q 30/0635; G06Q 10/063116; G06Q 10/063118; G06Q 10/08; G06Q 10/087
(Continued)

(56) References Cited

U.S. PATENT DOCUMENTS

| 5,909,023 A | 6/1999 | Ono |
| 6,123,259 A | 9/2000 | Ogasawara |

(Continued)

FOREIGN PATENT DOCUMENTS

| CN | 101778045 A | 7/2010 |
| CN | 101964799 A | 2/2011 |

(Continued)

OTHER PUBLICATIONS

ISR for corresponding Int'l Application No. PCT/CN2016/072791, dated Apr. 28, 2016 Apr. 4, 2016.
(Continued)

*Primary Examiner* — Renae Feacher
(74) *Attorney, Agent, or Firm* — Bryan Cave Leighton Paisner LLP (57) ABSTRACT

Systems and methods including one or more processors and one or more non-transitory storage devices storing computing instructions configured to run on the one or more processors and perform receiving, at the one or more processors, an order from a customer electronic device; determining, using employee device data collected from one or more electronic devices of one or more employees of a store in a predictive analysis, an estimated collection time required for an employee of the one or more employees of the store to collect the one or more items of the order; receiving a check-in from an electronic device indicating that a pickup is en-route to pick-up the order; when the electronic device authorizes location tracking, tracking a location of the pickup after receiving the check-in from the electronic device; periodically determining, at one or more time intervals, an estimated travel time for the pickup to travel to the store from the location, as tracked; and when the estimated collection time is approximately equal in duration to the estimated travel time, coordinating displaying instructions for the employee of the store to begin collecting the one or more items of the order. Other embodiments are disclosed herein.

20 Claims, 5 Drawing Sheets

(51) Int. Cl.
*G06Q 30/0601* (2023.01)
*G06Q 10/0631* (2023.01)

(58) Field of Classification Search
USPC .............................. 705/7.11, 7.15
See application file for complete search history.

(56) References Cited

U.S. PATENT DOCUMENTS

| | | | |
|---|---|---|---|
| 6,246,998 B1 | 6/2001 | Matsumori | |
| 6,266,649 B1 | 7/2001 | Linden | |
| 6,317,722 B1 | 11/2001 | Jacobi et al. | |
| 6,484,161 B1 | 11/2002 | Chipalkatti | |
| 6,876,958 B1 | 4/2005 | Chowdhury et al. | |
| 7,046,685 B1 | 5/2006 | Matsuoka | |
| 7,147,154 B2 | 12/2006 | Myers et al. | |
| 7,295,990 B1 | 11/2007 | Braumoeller et al. | |
| 7,747,543 B1 | 6/2010 | Braumoeller et al. | |
| 7,932,831 B2 | 4/2011 | Malik | |
| 7,949,686 B2 | 5/2011 | Chang et al. | |
| 8,005,761 B1 | 8/2011 | Braumoeller et al. | |
| 8,121,876 B1 | 2/2012 | Braumoeller et al. | |
| 8,201,737 B1 | 6/2012 | Palacios Durazo et al. | |
| 8,401,914 B1 | 3/2013 | Kim | |
| 8,428,988 B1 | 4/2013 | Braumoeller et al. | |
| 8,452,797 B1 | 5/2013 | Paleja et al. | |
| 8,560,461 B1 | 10/2013 | Tian | |
| 8,571,702 B1 | 10/2013 | Haake et al. | |
| 8,688,598 B1 | 4/2014 | Shakes et al. | |
| 8,732,028 B2 | 5/2014 | Napper | |
| 8,818,836 B1 | 8/2014 | Braumoeller et al. | |
| 9,015,069 B2 * | 4/2015 | Brantley | G06Q 30/0635 705/26.81 |
| 9,147,208 B1 | 9/2015 | Argue et al. | |
| 9,309,056 B2 | 4/2016 | Lafontaine | |
| 9,466,045 B1 | 10/2016 | Kumar | |
| 9,470,532 B2 | 10/2016 | Pellow et al. | |
| 9,569,745 B1 | 2/2017 | Ananthanarayanan | |
| 9,626,709 B2 | 4/2017 | Koch et al. | |
| 9,773,097 B2 | 9/2017 | Mu et al. | |
| 9,786,187 B1 | 10/2017 | Bar-zeev et al. | |
| 10,099,864 B1 | 10/2018 | Gopalakrishnan et al. | |
| 10,127,514 B2 | 11/2018 | Napoli | |
| 10,336,540 B2 | 7/2019 | Gravelle | |
| 10,445,807 B1 * | 10/2019 | Commons | G06Q 30/0623 |
| 10,460,332 B1 | 10/2019 | Kujat et al. | |
| 10,572,932 B2 | 2/2020 | Kumar | |
| 10,657,580 B2 | 5/2020 | Kumar | |
| 10,699,328 B2 | 6/2020 | Rajkhowa et al. | |
| 10,740,862 B1 | 8/2020 | Cui et al. | |
| 10,943,356 B2 | 3/2021 | Armstrong et al. | |
| 2002/0143655 A1 * | 10/2002 | Elston | G06Q 20/04 705/26.81 |
| 2002/0161664 A1 | 10/2002 | Shaya et al. | |
| 2002/0174038 A1 | 11/2002 | Chien | |
| 2002/0198756 A1 | 12/2002 | Ghaisas et al. | |
| 2003/0033177 A1 | 2/2003 | MacGonigle et al. | |
| 2003/0046169 A1 | 3/2003 | Fraser et al. | |
| 2003/0177072 A1 | 9/2003 | Bared | |
| 2003/0204431 A1 | 10/2003 | Ingman | |
| 2004/0010437 A1 | 1/2004 | Kiran et al. | |
| 2004/0068443 A1 * | 4/2004 | Hopson | G06Q 10/08 705/5 |
| 2004/0210621 A1 * | 10/2004 | Antonellis | G06Q 10/087 709/200 |
| 2005/0278062 A1 | 12/2005 | Janert et al. | |
| 2006/0020366 A1 | 1/2006 | Bloom | |
| 2007/0005377 A1 | 1/2007 | Cherry | |
| 2007/0094067 A1 | 4/2007 | Kumar | |
| 2007/0174144 A1 | 7/2007 | Borders et al. | |
| 2007/0244758 A1 | 10/2007 | Xie | |
| 2007/0250355 A1 | 10/2007 | Leet et al. | |
| 2009/0048878 A1 | 2/2009 | Metcalf | |
| 2009/0157472 A1 | 6/2009 | Burazin et al. | |
| 2009/0254398 A1 | 10/2009 | Smith | |
| 2009/0257081 A1 * | 10/2009 | Bouchard | G06Q 10/10 358/1.15 |
| 2009/0281921 A1 | 11/2009 | Foster et al. | |
| 2010/0010902 A1 | 1/2010 | Casey | |
| 2010/0194560 A1 | 8/2010 | Hojecki et al. | |
| 2010/0287025 A1 | 11/2010 | Fletcher et al. | |
| 2011/0173041 A1 | 7/2011 | Breitenbach et al. | |
| 2011/0213651 A1 | 9/2011 | Milana | |
| 2012/0023034 A1 | 1/2012 | Lynch et al. | |
| 2012/0078747 A1 | 3/2012 | Chakrabarti | |
| 2012/0123674 A1 | 5/2012 | Perks et al. | |
| 2012/0150340 A1 | 6/2012 | Suess et al. | |
| 2012/0173449 A1 | 7/2012 | Waddington | |
| 2012/0330458 A1 | 12/2012 | Weiss | |
| 2013/0030955 A1 | 1/2013 | David | |
| 2013/0035978 A1 | 2/2013 | Richardson et al. | |
| 2013/0185198 A1 | 7/2013 | Lorch | |
| 2013/0231990 A1 | 9/2013 | Munjal et al. | |
| 2013/0332273 A1 | 12/2013 | Gu et al. | |
| 2013/0346204 A1 | 12/2013 | Wissner-Gross et al. | |
| 2014/0003727 A1 | 1/2014 | Lortz et al. | |
| 2014/0040075 A1 | 2/2014 | Perry et al. | |
| 2014/0046733 A1 | 2/2014 | Grichnik et al. | |
| 2014/0095350 A1 | 4/2014 | Carr et al. | |
| 2014/0136255 A1 | 5/2014 | Grabovski et al. | |
| 2014/0156553 A1 | 6/2014 | Leach et al. | |
| 2014/0207615 A1 | 7/2014 | Li et al. | |
| 2014/0222623 A1 | 8/2014 | Napper | |
| 2014/0266616 A1 | 9/2014 | Jones et al. | |
| 2014/0278627 A1 | 9/2014 | Grabovski et al. | |
| 2014/0278635 A1 | 9/2014 | Fulton et al. | |
| 2014/0279294 A1 | 9/2014 | Field-Darragh | |
| 2014/0288696 A1 | 9/2014 | Lert | |
| 2014/0324491 A1 | 10/2014 | Banks et al. | |
| 2014/0336814 A1 | 11/2014 | Moore et al. | |
| 2014/0351101 A1 | 11/2014 | Danelski | |
| 2014/0379529 A1 | 12/2014 | Agasti et al. | |
| 2014/0379829 A1 * | 12/2014 | Mahdi | H04L 65/1016 709/206 |
| 2015/0051994 A1 | 2/2015 | Ward et al. | |
| 2015/0120514 A1 | 4/2015 | Deshpande et al. | |
| 2015/0170256 A1 | 6/2015 | Pettyjohn | |
| 2015/0186803 A1 * | 7/2015 | Stong | G06Q 10/02 705/5 |
| 2015/0187027 A1 | 7/2015 | Lowe | |
| 2015/0206093 A1 | 7/2015 | Trew et al. | |
| 2015/0242918 A1 | 8/2015 | McCarthy | |
| 2015/0278759 A1 * | 10/2015 | Harris | G06Q 10/08355 705/338 |
| 2015/0307278 A1 | 10/2015 | Wickham et al. | |
| 2015/0310447 A1 | 10/2015 | Shaw | |
| 2015/0363843 A1 | 12/2015 | Loppatto et al. | |
| 2015/0370251 A1 | 12/2015 | Siegel et al. | |
| 2016/0012391 A1 | 1/2016 | Burnett | |
| 2016/0055222 A1 | 2/2016 | Sarferaz | |
| 2016/0055452 A1 | 2/2016 | Qin | |
| 2016/0063604 A1 | 3/2016 | Shaffer et al. | |
| 2016/0071056 A1 | 3/2016 | Ellison et al. | |
| 2016/0092969 A1 | 3/2016 | Gopalsamy et al. | |
| 2016/0148300 A1 | 5/2016 | Carr et al. | |
| 2016/0155088 A1 * | 6/2016 | Pylappan | G06Q 10/0836 705/333 |
| 2016/0171592 A1 * | 6/2016 | Pugh | G06F 16/24 705/26.81 |
| 2016/0203543 A1 | 7/2016 | Snow | |
| 2016/0217513 A1 * | 7/2016 | Moghaddam | G06Q 10/067 |
| 2016/0223339 A1 | 8/2016 | Pellow et al. | |
| 2016/0247113 A1 * | 8/2016 | Rademaker | G06Q 10/083 |
| 2016/0253740 A1 | 9/2016 | Goulart | |
| 2016/0258762 A1 | 9/2016 | Taylor et al. | |
| 2016/0260158 A1 | 9/2016 | High et al. | |
| 2016/0299782 A1 | 10/2016 | Jones et al. | |
| 2016/0314335 A1 | 10/2016 | Al-Kofahi et al. | |
| 2016/0314429 A1 | 10/2016 | Gillen et al. | |
| 2016/0321605 A1 | 11/2016 | Maifeld et al. | |
| 2016/0328781 A1 | 11/2016 | Patel-Zellinger et al. | |
| 2016/0350837 A1 | 12/2016 | Williams et al. | |
| 2017/0011338 A1 * | 1/2017 | Stenneth | G01C 21/32 |
| 2017/0011449 A1 | 1/2017 | Mueller et al. | |

(56) References Cited

U.S. PATENT DOCUMENTS

| | | |
|---|---|---|
| 2017/0018041 A1 | 1/2017 | Fox |
| 2017/0024789 A1 | 1/2017 | Frehn et al. |
| 2017/0024805 A1* | 1/2017 | Tepfenhart, Jr. ... G06Q 10/0836 |
| 2017/0069013 A1 | 3/2017 | Castillo |
| 2017/0124511 A1* | 5/2017 | Mueller ............... H04W 4/029 |
| 2017/0200108 A1 | 7/2017 | Au et al. |
| 2017/0213186 A1 | 7/2017 | Grifoni |
| 2017/0228701 A1 | 8/2017 | Wosk et al. |
| 2017/0278047 A1 | 9/2017 | Welty et al. |
| 2017/0278176 A1 | 9/2017 | Valkov et al. |
| 2017/0285648 A1 | 10/2017 | Welty et al. |
| 2017/0369245 A1 | 12/2017 | Suemitsu et al. |
| 2017/0372226 A1 | 12/2017 | Costa |
| 2018/0075404 A1* | 3/2018 | Hendrickson ......... G06Q 50/30 |
| 2018/0096295 A1 | 4/2018 | Wang et al. |
| 2018/0121992 A1* | 5/2018 | Agarwal ............... H04W 4/029 |
| 2018/0137452 A1 | 5/2018 | Khartravath et al. |
| 2018/0182054 A1 | 6/2018 | Yao et al. |
| 2018/0218311 A1 | 7/2018 | Kumar |
| 2018/0218440 A1 | 8/2018 | Kumar et al. |
| 2018/0247257 A1 | 8/2018 | Lert, Jr. et al. |
| 2018/0253805 A1 | 9/2018 | Kelly et al. |
| 2018/0260744 A1 | 9/2018 | Fukuda et al. |
| 2018/0300800 A1 | 10/2018 | Rajkhowa et al. |
| 2018/0307998 A1 | 10/2018 | Strachan |
| 2018/0314991 A1 | 11/2018 | Grundberg |
| 2018/0342031 A1 | 11/2018 | Tada et al. |
| 2018/0349861 A1 | 12/2018 | Goja |
| 2018/0374046 A1 | 12/2018 | Powers et al. |
| 2019/0019240 A1* | 1/2019 | Smith ................ G06Q 30/0635 |
| 2019/0057347 A1 | 2/2019 | Vitek et al. |
| 2019/0197195 A1 | 6/2019 | Krishnamurthy et al. |
| 2019/0325377 A1 | 10/2019 | Rajkhowa et al. |
| 2019/0340561 A1 | 11/2019 | Rajkhowa et al. |
| 2020/0311644 A1 | 10/2020 | Willard, III et al. |
| 2021/0061566 A1 | 3/2021 | Cacioppo |
| 2021/0269244 A1 | 9/2021 | Ahmann |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| GB | 2524952 | 10/2015 |
| WO | 2015120506 | 8/2015 |
| WO | 2016119747 A1 | 8/2016 |
| WO | 2016119749 | 8/2016 |

OTHER PUBLICATIONS

Ertekin, S., & Pelton, L.E. (2015). Navigating the Retail Environment: An Exploratory Investigation of In-Store Mapping Applications. Academy of Marketing Studies Journal, 19(2), 37-48. Retrieved from https://search.proquest.com/docview/1750421168?accountid=14753 2015.

Sharma, Sanjay, A proposed hybrid Storage assignment framework: A case study, International Journal of Productivity and Performance Management, dated Jul. 2015. (Year:2015) Jul. 2015.

Chen, Mu-Chen and Wu, Hsiao-Pin, "An Association-Based Clustering Approach to Order Batching Considering Customer Deman Patterns," Omega33.4:333(11). Elsevier Schience Publishers. (Aug. 2005); Dialog #132271219; 14 pgs. Aug. 2005.

Matusiak, Marek et al., "Data-Driven warehouse optimization: deploying skills of order pickers", Finnish Centre of Excellence in Generic Intelligent Machines Research Jun. 29, 2015.

Elmahi, I., et al. "A genetic algorithm approach for the batches delivery optimization in a supply chain." IEEE International Conference on Networking, Sensing and Control, 2004. vol. 1. IEEE, 2004. (Year: 2004).

Fulton, Rick, Estimating Delivery Times: A Case Study in Practical Machine Learning, Postmates Blog, Oct. 23, 2015 Oct. 23, 2015.

Pingulkar et al., "Picking productivity estimation in distribution warehouses," Feb. 25, 2015 Feb. 25, 2015.

Mao et al., "Small boxes big data—deep learning approach to optimize variable sized bin packing," IEEE 3rd Conf Big Data Service, pp. 80-89, https://eeexplore.ieee.org/abstract/document/7944923 (Year: 2017) Apr. 6, 2017.

A. Ulbrich, S. Galka, and W.A. Gunther, "Secure Planning of Order Picking Systems with the Aid of Simulation," 2010 43rd Hawaii International Conference on System Sciences, Honolulu, HI, 2010, pp. 1-7, doi: 10.1109/HICSS.2010.326. (Year: 2010) 2010.

Y. Wang, Z. Wang, and S. Mi, "An Order Batching Clustering Algorithm of Fixed Maximum Order Number Based on Order Picking System," 2017 4th International Conference on Industrial Economics System and Industrial Security Engineering (IEIS), Kyoto, 2017, pp. 106, doi: 10.1109/IEIS.2017.8078640. (Year: 2017) 2017.

J.P. Gagliani, J. Renaud, and A. Ruiz, "A Simulation Model to Improve Warehouse Operations," 2007 Winter Simulation Conference, Washington, DC, 2007, pp. 2012-2018, doi: 10.1109/WSC.2007.4419831. (Year: 2007) 2007.

G. Pedrielli, A. Vinsensius, E.P. Chew, L.H. Lee, A. Duri, and Haobin Li, "Hybrid order picking strategies for fashion E-commerce warehouse systems," 2016 Winter Simulation Conference (WSC), Washington, DC, 2016, pp. 2250-2261, doi: 10.1109/WSC.2016.7822266. (Year: 2016) 2016.

J. Shiau and H. Ma, "An order picking heuristic algorithm for economical packing," Proceedings of the 11th IEEE Interntional Conference on Networking, Sensing and Control, Miami, FL, 2014, pp. 423-437, doi: 10.1109/CNSC.2014.6819665 (Year: 2014) 2014.

M. Bustillo, B. Menendez, E.G. Pardo, and A. Duarte, "An algorithm for batching, sequencing and picking operations in a warehouse," 2015 International Conference on Industrial Engineering and Systems Management (IESM), Seville, 2015, pp. 842-849, doi: 10.1109/IESM.2015.7380254. (Year: 2015) 2015.

* cited by examiner

| 405 – Receiving an order from a customer, the order comprising items available for purchase at a store. |

↓

| 410 – Determining an estimated collection time required for an employee of the store to collect the items of the order at the store. |

↓

| 415 – Receiving a mobile check-in from an electronic device indicating that a pickup is en-route to pick up the order at the store. |

↓

| 420 – Tracking a location of the electronic device after receiving the mobile check-in from the electronic device. |

↓

| 425 – Periodically determining, at one or more time intervals, an estimated travel time for the pickup to travel to the store from the location as tracked. |

↓

| 430 – Coordinating displaying a collection notification on a store interface of a store electronic device of the employee of the store instructing the employee of the store to begin collecting the items of the order. |

SYSTEMS AND METHODS FOR DETERMINING AN ORDER COLLECTION START TIME

CROSS-REFERENCE TO RELATED APPLICATIONS

This application is a continuation of application Ser. No. 15/649,461, filed Jul. 13, 2017, which is herein incorporated by this reference in its entirety.

TECHNICAL FIELD

This disclosure relates generally to use of a mobile check-in to determine when to begin collecting an online order.

BACKGROUND

Many customers of retail or grocery stores now desire the convenience of having their orders delivered to their homes and/or picking up their already-collected orders at a designated area of the store. These orders are often made online by the customers using a web site or mobile application for the store. Conventional methods and related systems of online grocery delivery or pickup orders typically require a store to collect the orders during morning hours and then dispense the orders to customers later in the day. Because collection of the orders typically occurs long before dispensing of the orders, the orders are conventionally required to be stored in a backroom of the store with multiple temperature zones. These conventional methods and systems of online grocery delivery or pickup orders, then, require both inefficient (1) investment of capital by the store, and also (2) application of human labor by employees of the store.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform receiving, at the one or more processors, an order from a customer electronic device; determining, using employee device data collected from one or more electronic devices of one or more employees of a store in a predictive analysis, an estimated collection time required for an employee of the one or more employees of the store to collect the one or more items of the order; receiving a check-in from an electronic device indicating that a pickup is en-route to pick-up the order; when the electronic device authorizes location tracking, tracking a location of the pickup after receiving the check-in from the electronic device; periodically determining, at one or more time intervals, an estimated travel time for the pickup to travel to the store from the location, as tracked; and when the estimated collection time is approximately equal in duration to the estimated travel time, coordinating displaying instructions for the employee of the store to begin collecting the one or more items of the order Various embodiments include a method. The method can be implemented via execution of computing instructions configured to run at one or more processors and configured to be stored at non-transitory computer-readable media The method can comprise receiving, at the one or more processors, an order from a customer electronic device; determining, using employee device data collected from one or more electronic devices of one or more employees of a store in a predictive analysis, an estimated collection time required for an employee of the one or more employees of the store to collect the one or more items of the order; receiving a check-in from an electronic device indicating that a pickup is en-route to pick-up the order; when the electronic device authorizes location tracking, tracking a location of the pickup after receiving the check-in from the electronic device; periodically determining, at one or more time intervals, an estimated travel time for the pickup to travel to the store from the location, as tracked; and when the estimated collection time is approximately equal in duration to the estimated travel time, coordinating displaying instructions for the employee of the store to begin collecting the one or more items of the order.

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving an order from a customer. The order can comprise one or more items available for purchase at a store. The one or more storage modules can be further configured to run on the one or more processing modules and perform an act of determining an estimated collection time required for an employee of the store to collect the one or more items of the order at the store. The one or more storage modules can be further configured to run on the one or more processing modules and perform an act of receiving a mobile check-in from an electronic device indicating that a pickup is en-route to pick up the order at the store. The one or more storage modules can be further configured to run on the one or more processing modules and perform an act of tracking a location of the electronic device after receiving the mobile check-in from the electronic device. The one or more storage modules can be further configured to run on the one or more processing modules and perform an act of periodically determining, at one or more time intervals, an estimated travel time for the pickup to travel to the store from the location as tracked. The one or more storage modules can be further configured to run on the one or more processing modules and perform an act of, when the estimated collection time is substantially equal in duration to the estimated travel time, coordinating displaying a collection notification on a store interface of a store electronic device of the employee of the store instructing the employee of the store to begin collecting the one or more items of the order.

Various embodiments include a method. The method can include receiving an order from a customer. The order can comprise one or more items available for purchase at a store. The method also can include determining an estimated collection time required for an employee of the store to collect the one or more items of the order at the store. The method also can include receiving a mobile check-in from an electronic device indicating that a vehicle is en-route to pick up the order at the store. The method also can include tracking a location of the electronic device after receiving the mobile check-in from the electronic device. The method also can include continually determining, at one or more time intervals, an estimated travel time for the vehicle to travel to the store from the location as tracked. The method also can include, when the estimated collection time is substantially equal in duration to the estimated travel time, coordinating displaying a collection notification on a store interface of a store electronic device of the employee of the store instructing the employee of the store to begin collecting the one or more items of the order.

Figure 1:
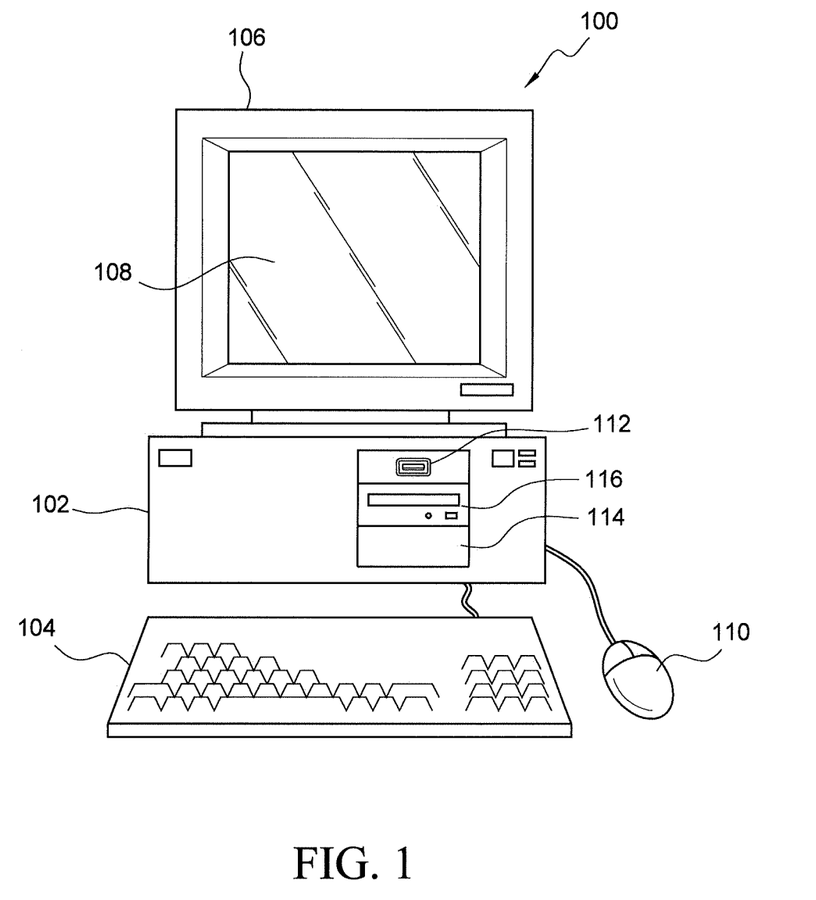
FIG. 1 illustrates a front elevational view of a computer system that is suitable for implementing various embodiments of the systems disclosed in FIGS. 3 and 5.
Figure 2:
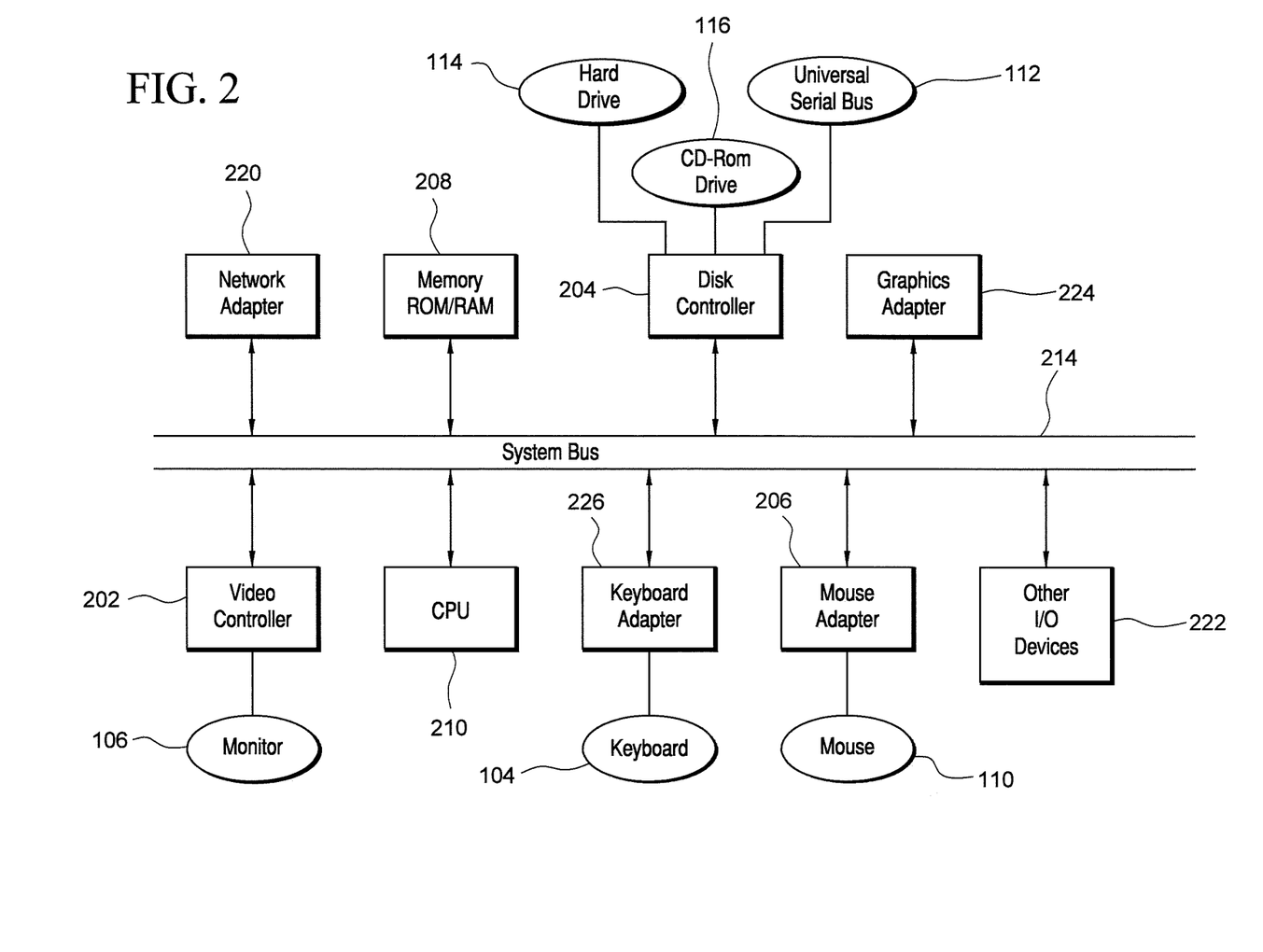
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
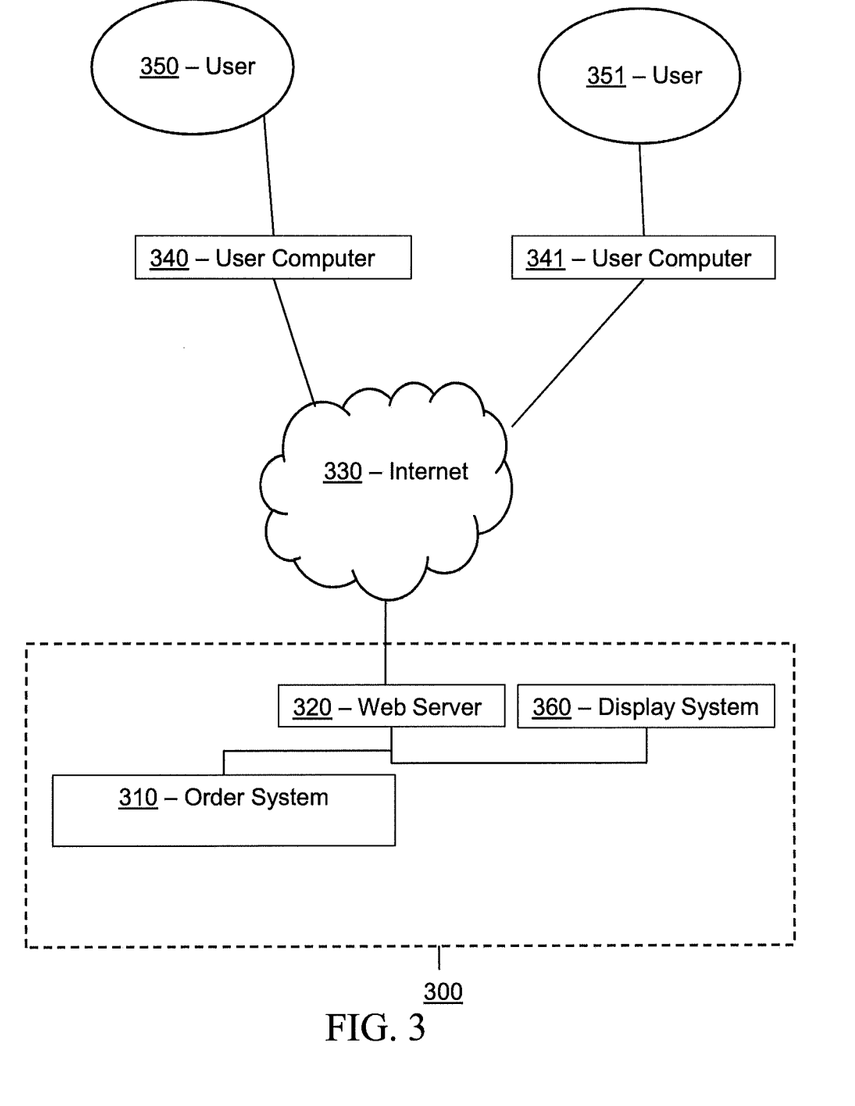
FIG. 3 illustrates a representative block diagram of a system, according to an embodiment.

Turning ahead in the drawings, FIG. 3 illustrates a block diagram of a system 300 that can be employed for determining an order collection start time, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an order system 310, a web server 320, and a display system 360. Order system 310, web server 320, and/or display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of order system 310, web server 320, and/or display system 360. Additional details regarding order system 310, web server 320, and/or display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smart-phone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, order system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) order system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of order system 310, web server 320, and/or display system 360. In a similar manner, the processing module(s) and the memory storage module(s) can be local and/or remote to each other.

In many embodiments, order system 310, web server 320, and/or display system 360 can be configured to communicate with one or more user computers 340 and 341. In some embodiments, user computers 340 and 341 also can be referred to as customer computers. In some embodiments, order system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, order system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, order system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between order system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
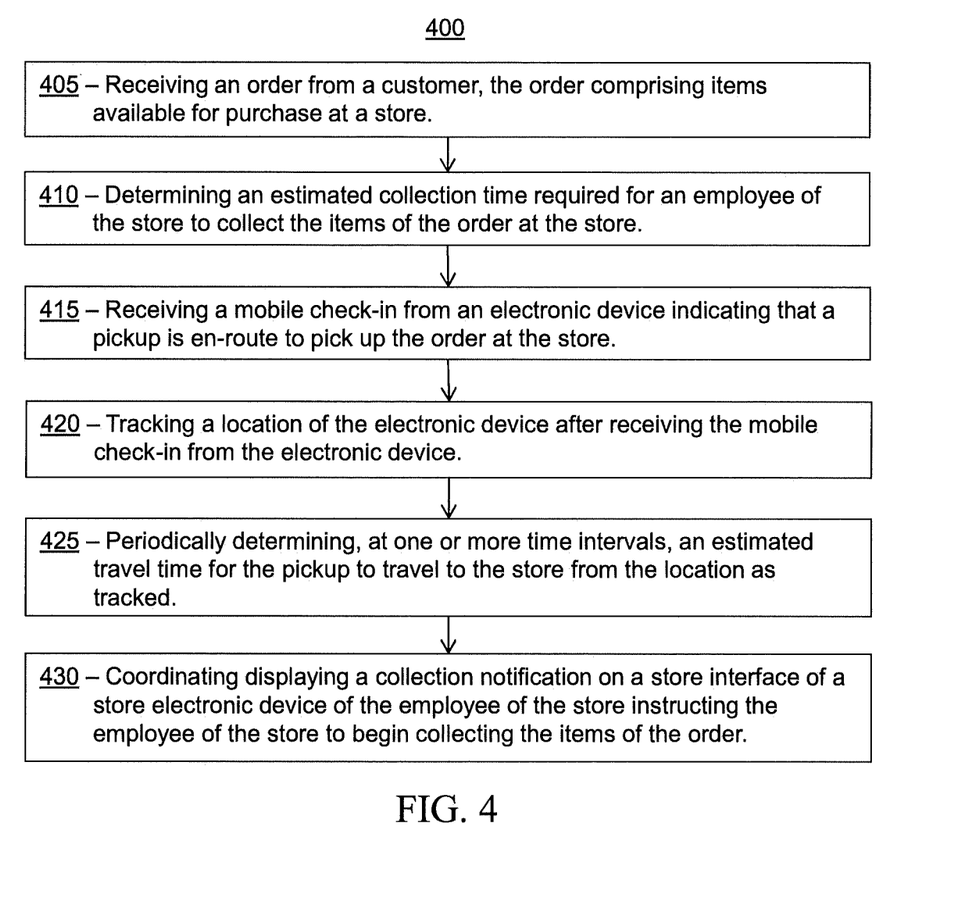
FIG. 4 is a flowchart for a method, according to certain embodiments.
Figure 5:
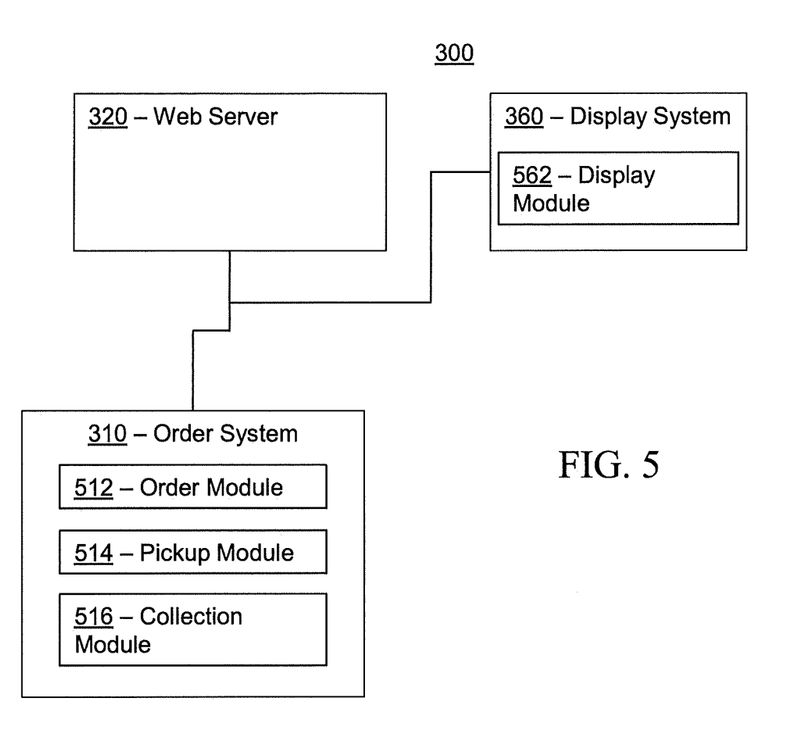
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 516 and/or 562 (FIG. 5). Such non-transitory memory storage modules can be part of a computer system such as order system 310, web server 320, and/or display system 360 (FIGS. 3 & 5). The processing module(s) can be similar or identical to the processing module(s) described above with respect to computer system 100 (FIG. 1).

Conventional methods and related systems of online grocery delivery or pickup orders typically require a store to collect the orders during morning hours and then dispense the orders to customers later in the day. Because collection of the orders typically occurs long before dispensing of the orders, the orders are conventionally required to be stored in a backroom of the store with multiple temperature zones. These conventional methods and systems of online grocery delivery or pickup orders, then, require both inefficient (1) investment of capital by the store, and also (2) application of human labor by employees of the store.

To solve these problems associated with and exclusive to online orders, various embodiments of method 400 and related systems utilize a mobile check-in feature to track customers or the delivery service on the way to pick up orders. The delivery service can be a third-party delivery service or an in-house delivery service. When the estimated time required to collect the order is substantially equal to an estimated arrival time of the delivery service or customer to pick up the order, system 300 (FIG. 3) can notify the employee of the store to begin collecting the order. This improvement over conventional systems allows a store employee to dispense the order to the customer or delivery service without storing the order in the backroom of the store and/or retrieving the order from the backroom of the store before dispensing the order.

Method 400 can comprise an activity 405 of receiving an order from a customer. The order can comprise a delivery order or a pickup order. In many embodiments, method 400 can be utilized when customers are placing orders on a website or application of a store. The orders can be placed by the customers using electronic devices, such as but not limited to mobile electronic devices like watches or phones, tablet computer electronic devices, desktop computer electronic devices, and the like. The orders placed by customers can be for one or more items sold by the store or retailer, including but not limited to groceries, electronics, clothing, media, equipment, and so on. In some embodiments, the website of the store can be associated with one or more brick and mortar retail stores within a predetermined proximity to the customer placing the order, one or more fulfillment centers, one or more warehouses, one or more distribution centers, and the like.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, activity 405 can vary depending upon whether the order is a pickup order or a delivery order. For example, if the order is a pickup order, activity 405 can comprise receiving the pickup order from a customer electronic device. The pickup order also can comprise one or more items available for purchase at the store, but also can specify that the customer (or anyone assigned by the customer) will pick up the one or more items at the store. In some embodiments, activity 405 can comprise receiving the pickup order from the customer electronic device for a customer pickup of the pickup order at the store during an assigned or selected window of time.

In contrast, if the order is a delivery order, activity 405 can comprise receiving a delivery order from a customer electronic device. The delivery order also can comprise one or more items available for purchase at the store, but also can specify that a delivery service will pick up the one or more items from the store and deliver the one or more items to the customer. In some embodiments, activity 405 can comprise receiving the delivery order from the customer electronic device for a delivery of the delivery order to the customer during an assigned or selected window of time. In many embodiments, as shall be described in greater detail below, the store coordinates requesting a delivery service to deliver the delivery order. Although references are made to deliveries of orders to customers, it is understood that the systems and methods can include a customer placing an order for delivery to another person who may or may not be a customer.

Method 400 also can comprise an activity 410 of determining an estimated collection time required for an employee of the store to collect the items of the order at the store. In many embodiments, activity 410 can comprise determining the estimated collection time required for the employees of the store to collect the items of the order at the store using a regression model that is based on one or more of: (1) one or more locations of the one or more items in the store; (2) a number of commodity switches required to collect the one or more items at the store; (3) a historical performance of the employee of the store assigned to collect the one or more items of the order; and/or (4) a time of day when the order is collected at the store by the employee. The number of commodity switches can include the number of times an associate must switch between different commodities in the store to collect the one or more items. For example, a number of times a user must switch from the refrigerated or frozen section of the store to the room temperature section of the store. In some embodiments, the number commodity switches can comprise a number of aisle switches of how many aisles must be traversed in the store based on the item locations within commodity for an associate to collect the order. The time of day can affect the estimated collection time due to the store being more or less crowded at certain times of the day.

In some embodiments, the estimated collection time can be determined using a regression analysis for estimating the relationships among variables. The regression analysis used can use the relationship between a dependent variable and one or more independent variables (or "predictors"). The regression model can determine how picking time (or the dependent variable or "criterion variable") can be modeled changes when any one of the independent variables is varied for each order. The independent variables can include, for example, a number of: (1) a total number of ambient, chilled, and/or frozen products; and/or (2) a total number of ambient, chilled, and/or frozen products.

In some embodiments, linear regression can be used where the relationships are modeled using linear predictor functions whose unknown model parameters are estimated from data. For example, given a variable y and a number of variables $X_1, \ldots, X_p$ that may be related toy, linear regression analysis can be applied to quantify the strength of the relationship between y and the $X_j$, to assess which $X_j$ may have no relationship with y at all, and to identify which subsets of the $X_j$ contain redundant information about y.

In a non-limiting example, the following was used to determine with all values of A based on historical data, and then used to estimate picking time based on order related variables:

Estimated Collection Time=$A1X1,A2X2,A3X3,A4X4, A5X5 \ldots AnXn$+Constant+Error where constant is a required value for each estimation, A are coefficients, and X are order related variables that impact picking. Independent variables or order related variables that impact collection time can be determined through techniques of feature selection, and then reducing the independent variables or order related variables to the features that impacted the collection time the most. Information for feature selections can be used to select features that are most important to collection time and discard irrelevant or redundant features.

Method 400 also can comprise an activity 415 of receiving a mobile check-in from an electronic device indicating that a pickup is en-route to pick up the order at the store. The pickup can be a customer or delivery service employee walking to the store, or riding a bike to the store. The pickup also can be customer or delivery service employee taking a bus, a subway, or a train to the store. The pickup further can be a customer or delivery service employee driving a car, or taking a taxi, rideshare, and/or or other transportation method to the store. The pickup also can be a customer or delivery service authorizing an autonomous vehicle, drone, etc. to travel to the store. The electronic device can comprise a mobile electronic device like a watch, a phone, a tablet computer electronic device, and the like. In some embodiments, the electronic device can comprise an electronic device built into the vehicle of the customer or the delivery vehicle picking up the order.

In many embodiments, activity 415 can vary depending upon whether the order is a pickup order or a delivery order. For example, if the order is a pickup order, activity 415 can comprise receiving the mobile check-in from the customer electronic device indicating a pickup is en-route to pick up the pickup order at the store. In pickup orders, the customer electronic device can be a same customer electronic device or a different electronic device on which the pickup order was placed. If the order is a delivery order, activity 415 can comprise receiving the mobile check-in from a delivery electronic device of the delivery service indicating the delivery service is en-route to pick up the delivery order at the store.

Certain aspects of mobile check-ins are described in U.S. patent application Ser. No. 15/339,808 to Agarwal, et al., filed Oct. 31, 2016 and titled "Customer Check-In System and Non-Transitory Computer Readable Storage Media for Checking-In a Customer," the contents of which are all hereby incorporated by reference.

In some embodiments, activity 415 can further comprise receiving a type of vehicle and/or mode of transportation during the mobile check-in. For example, the customer or delivery driver, service, or vehicle can select the mode of transportation as a car, a truck, a bicycle, a drone, a driverless vehicle, public transportation such as a bus, subway or other trains, or even a customer walking to the store.

Method 400 also can comprise an activity 420 of tracking a location of the electronic device after receiving the mobile check-in from the electronic device. For example, when a customer or delivery service checks-in, the customer electronic device or the delivery electronic device, respectively, can display a prompt inquiring whether or not the interface has permission to use the current location of the customer electronic device or the delivery electronic device. More particularly, the system 300 (FIG. 3) can seek permission or authorization from the customer or the delivery service or vehicle to activate an internal global positioning system (GPS) unit of the customer electronic device or the delivery electronic device to identify the current location of the customer electronic device or the delivery electronic device. With permission, the customer electronic device or the delivery electronic device can obtain and transmit signals to system 300 (FIG. 3), including tracking information with the current location of the customer electronic device or the delivery electronic device.

In many embodiments, activity 420 can vary depending upon whether the order is a pickup order or a delivery order. For example, if the order is a pickup order, activity 420 can comprise tracking the location of the customer electronic device after receiving the mobile check-in from the customer electronic device. If the order is a delivery order, activity 420 can comprise tracking the location of the delivery electronic device after receiving the mobile check-in from the delivery electronic device.

Method 400 also can comprise an activity 425 of periodically determining, at one or more time intervals, an estimated travel time for the pickup to travel to the store from the location as tracked. Time intervals can comprise but are not limited to, for example, 15 second intervals, 30 second intervals, 60 second intervals, 90 second intervals, 2 minute intervals, and the like. In many embodiments, activity 425 can comprise determining, depending upon the mode of transportation, an estimated travel time for the pickup to travel to the store from the location as tracked. For example, if the mode of transportation is a customer, an employee, or a third party driving a car, a motorcycle, or a truck (or an autonomous car, motorcycle, or truck), activity 425 can comprise periodically determining an estimated travel time for the car, the motorcycle, or the truck to travel to the store from the location as tracked. If the mode of transportation is a bicycle, activity 425 can comprise periodically determining an estimated travel time for a bicyclist to travel to the store from the location as tracked. If the mode of transportation is a bus, train, taxi, rideshare, or some other mode of public transportation, activity 425 can comprise periodically determining an estimated travel time for an individual to travel to the store from the location as tracked using such public transportation. If the mode of transportation is walking, activity 425 can comprise periodically determining an estimated travel time for an individual walking to the store from the location as tracked. If the mode of transportation is a manually-controlled or autonomous vehicle or drone, activity 425 can comprise periodically determining an estimated travel time for the vehicle or drone to travel to the store from the location as tracked.

In some optional embodiments, activity 425 comprises determining only once an estimated travel time for the pickup to travel to the store from the location as tracked. For example, in some embodiments, a location of the vehicle and/or electric device of the customer or delivery service is determined only when the customer or delivery service initially checks-in. Transmitting the collection notification to the store employee, as described in greater detail below, can be based off this single determination of the estimated travel time made when the customer or delivery service initially checks-in.

In many embodiments, activity 425 can vary depending upon whether the order is a pickup order or a delivery order. For example, if the order is a pickup order, activity 425 can comprise periodically determining, at the one or more time intervals, the estimated travel time for the customer vehicle to travel to the store from the location as tracked. If the order is a delivery order, activity 425 can comprise periodically determining, at the one or more time intervals, the estimated travel time for the delivery vehicle, whether autonomous or not, to travel to the store from the location as tracked.

Method 400 also can comprise an activity 430 of, when the estimated collection time is substantially equal in duration to the estimated travel time, coordinating displaying a collection notification on a store interface of a store electronic device of the employee of the store instructing the employee of the store to begin collecting the items of the order. In some embodiments, the collection notification also can comprise an estimated arrival time of the vehicle for the customer pickup or the delivery pickup. Activity 430 also can comprise an activity of generating instructions for providing a store interface on the store electronic device that displays, when the estimated collection time is substantially equal in duration to the estimated travel time, the collection notification instructing the employee of the store to begin collecting the items of the order. Activity 430 is advantageous to conventional systems because it facilitates near simultaneous and/or real-time completion of collecting the one or more items of the order by the employee store and arrival at the store of the customer or the delivery pickup at the store. This near simultaneous and/or real-time completion allows the employee of the store to dispense the order to the customer or the delivery pickup without storing or retrieving the order.

Activity 430 also can comprise additional optional activities depending on whether the order is a pickup order or a delivery order. For example, if the order is a pickup order, activity 430 can optionally comprise one or more activities of: coordinating displaying vehicle information for the customer vehicle on the store interface of the store electronic device; coordinating displaying a collected order notification on a customer interface of the customer electronic device, the collected order notification indicating that the order has been collected by the employee of the store and is ready to be picked up at the store; coordinating displaying, on the store interface of the store electronic device, the estimated travel time for the customer vehicle to travel to the store from the location as tracked; and/or coordinating displaying a customer arrival notification on the store interface of the store electronic device, the customer arrival notification indicating that the customer has arrived at the store. Moreover, activity 430 can optionally comprise one or more activities of generating instructions for providing a store interface on the store electronic device that displays vehicle information for the customer vehicle, the estimated travel time for the customer vehicle to travel to the store from the location as tracked, and/or a customer arrival notification. Activity 430 also can optionally comprise an activity of generating instructions for providing a customer interface on the customer electronic device that displays the collected order notification.

If, however, the order is a delivery order, activity 430 can optionally comprise one or more activities of: coordinating displaying vehicle information for the delivery vehicle on the store interface of the store electronic device; coordinating displaying, on the store interface of the store electronic device, the estimated travel time for the delivery service to travel to the store from the location as tracked; coordinating displaying a delivery service arrival notification on the store interface of the store electronic device, the delivery service notification indicating that the delivery service has arrived at the store; and/or coordinating displaying a collected order notification on a delivery interface of the delivery electronic device, the collected order notification indicating that the order has been collected by the employee of the store. Moreover, activity 430 can optionally comprise one or more activities of generating instructions for providing a store interface on the store electronic device that displays vehicle information for the delivery vehicle, the estimated travel time for the delivery service to travel to the store from the location as tracked, and/or a delivery service arrival notification. Activity 430 also can optionally comprise an activity of generating instructions for providing a delivery interface on the delivery vehicle electronic device that displays the collected order notification.

FIG. 5 illustrates a block diagram of a portion of system 300 comprising order system 310, web server 320, and display system 360, according to the embodiment shown in FIG. 3. Each of order system 310, web server 320, and display system 360 is merely exemplary and not limited to the embodiments presented herein. Each of order system 310, web server 320, and/or display system 360 can be employed in many different embodiments or examples not specifically depicted or described herein. In some embodiments, certain elements or modules of order system 310, web server 320, and/or display system 360 can perform various procedures, processes, and/or acts. In other embodiments, the procedures, processes, and/or acts can be performed by other suitable elements or modules.

In many embodiments, order system 310 can comprise non-transitory memory storage module 512. Memory storage module 512 can be referred to as order module 512. In many embodiments, order module 512 can store computing instructions configured to run on one or more processing modules and perform one or more acts of method 400 (FIG. 4) (e.g., activity 405 of receiving an order from a customer, the order comprising items available for purchase at a store (FIG. 4)).

In many embodiments, order system 310 also can comprise non-transitory memory storage module 514. Memory storage module 514 can be referred to as pickup module 514. In many embodiments, pickup module 514 can store computing instructions configured to run on one or more processing modules and perform one or more acts of method 400 (FIG. 4) (e.g., activity 415 of receiving a mobile check-in from an electronic device indicating that a vehicle is en-route to pick up the order at the store, activity 420 of tracking a location of the electronic device after receiving the mobile check-in from the electronic device, and activity 425 of periodically determining, at one or more time intervals, an estimated travel time for the pickup to travel to the store from the location as tracked (FIG. 4)).

In many embodiments, order system 310 also can comprise non-transitory memory storage module 516. Memory storage module 516 can be referred to as collection module 516. In many embodiments, collection module 516 can store computing instructions configured to run on one or more processing modules and perform one or more acts of method 400 (FIG. 4) (e.g., activity 410 of determining an estimated collection time required for an employee of the store to collect the items of the order at the store (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 430 of coordinating displaying a collection notification on a store interface of a store electronic device of the employee of the store instructing the employee of the store to begin collecting the items of the order (FIG. 4)).

Although systems and methods for determining an order collection start time have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
receiving, by the one or more processors, an order from a customer electronic device;
determining, using a predictive analysis, an estimated collection time required for an employee of one or more employees of a store to collect one or more items of the order, wherein data used for the predictive analysis comprises employee device data collected from one or more electronic devices of the one or more employees of the store;
receiving, by the one or more processors, a mobile check-in from an electronic device indicating that a pickup is en-route to pick-up the order;
in response to receiving the mobile check-in, requesting, by the one or more processors, permission for location tracking from the electronic device;
when the electronic device authorizes the permission for the location tracking, tracking, by the one or more processors, a location of the pickup after receiving the mobile check-in from the electronic device;
periodically determining, by the one or more processors, an estimated travel time for the pickup to travel to the store from the location, as tracked; and
when the estimated collection time is approximately equal in duration to the estimated travel time, transmitting, by the one or more processors, a collection notification on a store interface of one of the one or more electronic devices of the employee of the store of the one or more employees of the store, wherein the collection notification comprises instructions for the employee of the store to begin collecting the one or more items of the order.

2. The system of claim 1, wherein:
the predictive analysis comprises a regression analysis.

3. The system of claim 1, wherein the predictive analysis operates as a function of at least one of:
one or more locations of the one or more items of the order;
a number of commodity switches required for the one or more employees to collect the one or more items of the order;
a historical performance of the employee assigned to collect the one or more items of the order;
a temperature sensitivity of at least one of the one or more items of the order; or
a time of day when the order is collected by the employee.

4. The system of claim 1, wherein the pickup comprises at least one of:
a customer;
one or more employees;
a third party delivery service;
an autonomous vehicle; or
a drone.

5. The system of claim 1, wherein the computing instructions, when executed on the one or more processors, further cause the one or more processors to perform a function comprising:
coordinating displaying vehicle information for the pickup on the electronic device of the employee of the one or more employees of the store.

6. The system of claim 1, wherein the computing instructions, when executed on the one or more processors, further cause the one or more processors to perform a function comprising:
when the order has been collected by the employee, coordinating displaying a collected order notification on the customer electronic device, the collected order notification indicating that the order has been collected by the employee of the store.

7. The system of claim 1, wherein the computing instructions, when executed on the one or more processors, further cause the one or more processors to perform a function comprising:
when the electronic device authorizes the permission for the location tracking, coordinating displaying an estimated pickup arrival time on at least the customer electronic device or the electronic device of the employee of the one or more employees.

8. The system of claim 1, wherein the predictive analysis comprises feature selection techniques.

9. The system of claim 1, wherein the computing instructions, when executed on the one or more processors, further cause the one or more processors to perform a function comprising:
when the pickup delivers the order, coordinating displaying a delivery notification on the customer electronic device or the electronic device of the employee of the one or more employees.

10. The system of claim 1, wherein the predictive analysis comprises:
determining, using the employee device data collected from the one or more electronic devices of the one or more employees of the store:
one or more independent variables affecting the estimated collection time;
respective coefficients of each respective independent variable of the one or more independent variables affecting the estimated collection time; and
a constant applicable to historical picking data of the employee of the store.

11. A method being implemented via execution of computing instructions configured to run at one or more processors and stored at non-transitory computer-readable media, the method comprising:
receiving, by the one or more processors, an order from a customer electronic device;
determining, using a predictive analysis, an estimated collection time required for an employee of one or more employees of a store to collect one or more items of the order, wherein data used for the predictive analysis comprises employee device data collected from one or more electronic devices of the one or more employees of the store;
receiving, by the one or more processors, a mobile check-in from an electronic device indicating that a pickup is en-route to pick-up the order;
in response to receiving the mobile check-in, requesting, by the one or more processors, permission for location tracking from the electronic device;
when the electronic device authorizes the permission for the location tracking, tracking, by the one or more processors, a location of the pickup after receiving the mobile check-in from the electronic device;
periodically determining, by the one or more processors, an estimated travel time for the pickup to travel to the store from the location, as tracked; and
when the estimated collection time is approximately equal in duration to the estimated travel time, transmitting, by the one or more processors, a collection notification on a store interface of one of the one or more electronic devices of the employee of the store of the one or more employees of the store, wherein the collection notification comprises instructions for the employee of the store to begin collecting the one or more items of the order.

12. The method of claim 11, wherein:
the predictive analysis comprises a regression analysis.

13. The method of claim 11, wherein the predictive analysis operates as a function of at least one of:
one or more locations of the one or more items of the order;
a number of commodity switches required for the one or more employees to collect the one or more items of the order;
a historical performance of the employee assigned to collect the one or more items of the order;
a temperature sensitivity of at least one of the one or more items of the order; or
a time of day when the order is collected by the employee.

14. The method of claim 11, wherein the pickup comprises at least one of:
a customer;
one or more employees;
a third party delivery service;
an autonomous vehicle; or
a drone.

15. The method of claim 11 further comprising:
coordinating displaying vehicle information for the pickup on the electronic device of the employee of the one or more employees of the store.

16. The method of claim 11 further comprising:
when the order has been collected by the employee, coordinating displaying a collected order notification on the customer electronic device, the collected order notification indicating that the order has been collected by the employee of the store.

17. The method of claim 11 further comprising:
when the electronic device authorizes the permission for the location tracking, coordinating displaying an estimated pickup arrival time on at least the customer electronic device or the electronic device of the employee of the one or more employees.

18. The method of claim 11, wherein the predictive analysis comprises feature selection techniques.

19. The method of claim 11 further comprising:
when the pickup delivers the order, coordinating displaying a delivery notification on the customer electronic device or the electronic device of the employee of the one or more employees.

20. The method of claim 11, wherein the predictive analysis comprises:
determining, using the employee device data collected from the one or more electronic devices of the one or more employees of the store:
one or more independent variables affecting the estimated collection time;
respective coefficients of each respective independent variable of the one or more independent variables affecting the estimated collection time; and
a constant applicable to historical picking data of the employee of the store.

* * * * *